March 21, 1933.    L. B. MARTIN    1,902,567
CALENDAR AND RECORD
Filed March 19, 1932    2 Sheets-Sheet 1
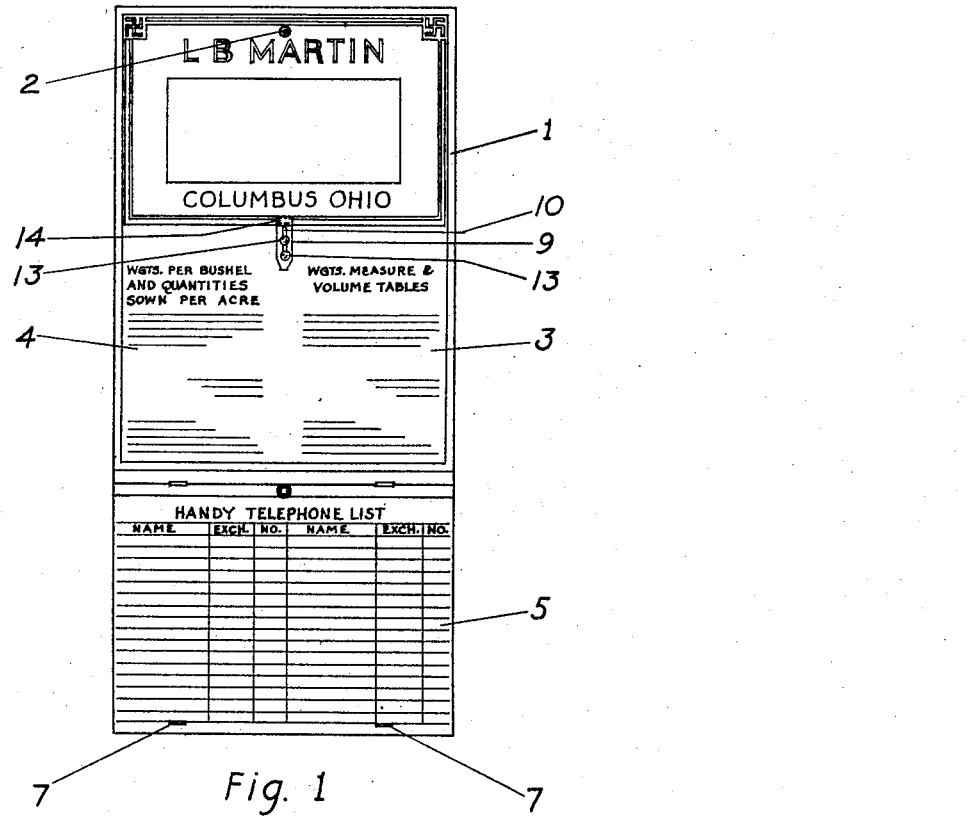
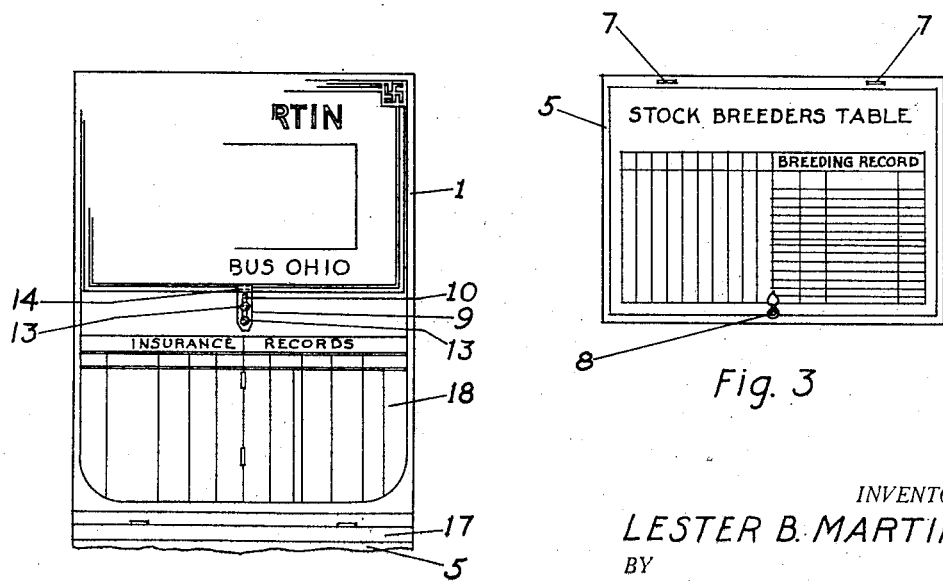
INVENTOR.
LESTER B. MARTIN
BY
*N. F. Babcock*
ATTORNEY.

March 21, 1933.    L. B. MARTIN    1,902,567
CALENDAR AND RECORD
Filed March 19, 1932    2 Sheets-Sheet 2
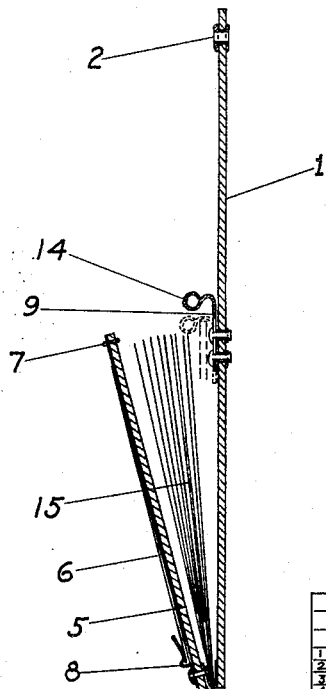
Fig. 2
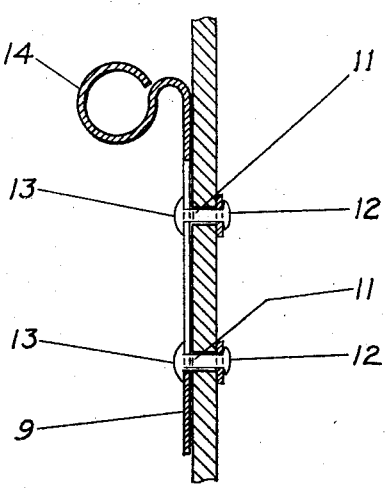
Fig. 4
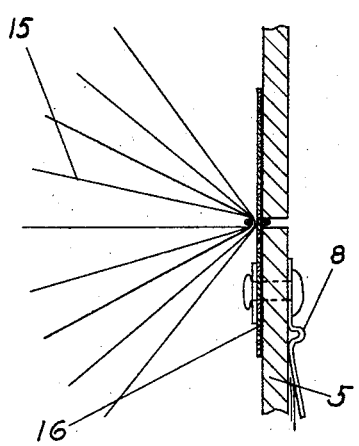
Fig. 6
Fig. 7
*INVENTOR.*
LESTER B. MARTIN
BY
*H. H. Babcock*
*ATTORNEY.*

Patented Mar. 21, 1933

1,902,567

UNITED STATES PATENT OFFICE

LESTER B. MARTIN, OF COLUMBUS, OHIO

CALENDAR AND RECORD

Application filed March 19, 1932. Serial No. 599,986.

The invention to be hereinafter described relates to a combination calendar and record.

A great variety of calendars are known, and a number of combined calendars and records. As heretofore made, these combinations have had, among other objections, three serious drawbacks. They consisted of an excessive number of parts. Because of this, they were expensive to manufacture. Because of the number of parts they were awkward to manipulate, cumbersome and bulky. They were fragile and did not stand well the usage to which they had to be subjected.

The main objects of the present invention are to avoid these and other draw backs and provide a calendar and record combined, in which the number of parts will be reduced to the minimum, with corresponding economy in cost of production; manipulation of the parts will be simplified; and the parts will be so mounted and disposed as to give greatest compactness and, at the same time, provide best against the usage to which the calendar must be subjected.

A further object is to provide a record book which is also a medium of connection between parts of the calendar support and may be severed from these parts when the calendar has been used up, and filed as a permanent record.

A further object is to provide a protecting pocket for the book, comprising calendar supporting members which are flexibly connected together through the book.

In order to more clearly disclose the construction, operation and use of the invention, reference should be had to the accompanying drawings forming part of this application. Throughout the several figures of the drawings, like reference characters designate the same parts in the different views.

In the drawings:—

Fig. 1 is a front view with record book removed and moveable section lowered;

Fig. 2 is a vertical cross section through the connections between record book and calendar, with the moveable section raised toward but not engaged by its fastener;

Fig. 3 is a front view of the moveable section, with calendar pad removed;

Fig. 4 is a detail cross section through the pencil holder and catch—greatly enlarged and parts somewhat exaggerated;

Fig. 5 is a front view of the upper half, only, showing a modified record book and its mounting;

Fig. 6 is a fragmentary cross section through the book back, showing attaching strip, greatly enlarged and parts exaggerated; and Fig. 7 is a plan view of two adjoining sheets of the record book showing daily and monthly entry spaces.

Referring to the drawings in detail, 1 indicates a back or base of any suitable material such as card board, fibre board or similar light weight relatively stiff or rigid material adapted to be hung, in usual and well known manner from a nail, hook or the like, to lie flat against a wall. For this purpose, an eyelet 2 may be provided in the part 1 at a point near the upper edge and about half way between the sides—i. e. at a point where the calendar will be balanced and hang vertically or straight. The upper part of this back is adapted to contain an attractive picture and the name and address of the donor or other party. Obviously, spaces may be provided for brief advertisements, or items of information. The lower part of this back or base, when the calendar part is in use, is in the rear of the calendar carrying section and is completely hidden from view. It may be used for recording certain useful information.

From the lower edge of this base or back is hinged; in a manner to be hereinafter described, a calendar carrying section 5 adapted to swing vertically about the horizontal lower edge of section 1 as an axis—i. e. it swings toward and from section 1 as a book leaf swings.

Secured to and normally covering this outer face of section 5 is a calendar pad 6 of usual and well known type. The upper edges of its leaves are secured by staples 7 or the like to the section 5. The lower edges of the separate sheets of the calendar are free but are held in place flat against section 5 by a small yielding metal clip in the form of a turn button 8. In operative position, as in Figs. 2 and 3, the turn button holds the leaves of the calendar flat against section 5. This is very important when the section 5 drops down, as in Figs. 1 and 5. With the calendar sheets so held, section 5 and attached calendar 6 are, in effect, one flat section. Together, they swing flat against the wall. In some other known calendars this is not possible because these calendars' leaves are not held. Instead, they drop by gravity and hang in a bundle back and down from their staples. Such calendars can not be dropped to the position of Fig. 1, to lie flat against the wall. If they are opened wide, a few times, the calendar leaves bend up and project from the pad, ruining both the appearance and usefulness of the calendar. In the present invention the calendar pad is always flat, smooth, in place, attractive and instantly useful.

In order to hold section 5 in its raised or closed position or superposed upon the lower part of the base 1, a combined pencil holder and catch is provided. Preferably, this comprises a small metal plate 9 mounted to slide vertically on the base or back 1. To this end, plate 9 is provided with a longitudinal slot 10 adapted to freely receive the stems or shanks 11 of headed guide pins, rivets or the like 12. These pins extend through the back 1 and slidably connect the plate thereto. As will be clear, these pins also act as guides for the plate 9 in its vertical travel. They are so placed as to allow a limited vertical travel of plate 9 on the back 1. At least two are necessary to guide the plate. With a single pin, only, the plate would simply rotate about it as a pivot. The heads 13 of the pins, of course, prevent the plate from becoming displaced—they retain it in position. A number of other constructions and arrangements may be used, producing the same result, and varying only in details of construction. It is neither necessary nor advisable to further illustrate the same, here. The construction shown and described is the simplest, most efficient, and the most compact and economical. It comprises the least possible number of parts. The upper end of plate 9 is bent outwardly and rolled into a tube or loop 14 as a pencil holder. This rolled portion also functions as a sliding catch to hold the section 5 in raised or closed position, as will be clear on reference to Fig. 2. It is only necessary to close section 5 flat against the base 1 and then slip catch 9 to the lowered or dotted line position. Loop 14 will then overlap and engage the upper edge of section 5, as indicated in dotted lines and hold it raised. By raising the loop to full line position, section 5 may be dropped, as in Fig. 1.

In the preferred form, sections 1 and 5 are flexibly hinged along their adjoining edges through the medium of a permanent record book 15. This book may be bound together by staples in usual and well known manner. The binding staples or other securing means, also attaches to the back of the book a relatively wide strip of canvas 16. This strip, preferably, extends the full length of the book, and the length of the book is substantially equal to the width of the sections 1 and 5. It is attached to the book only along its longitudinal center, leaving a strip of considerable width at each side of the book back. The outer face—that face not next to the book—is provided with a suitable adhesive by which it may be stuck to the edges of the sections 1 and 5, as shown in detail in Fig. 6. The record book thus provides a medium for flexibly connecting or hinging said sections together. At the same time, these sections, thus connected, provide a permanent support for holding the book always in immediately accessible position and quickly ready for reference and to receive entries.

Calendars are of course, usable for a year. At the end of a year the record book, with its entries, may be easily detached by simply cutting the canvas strip. The book may then be filed as a permanent record. The same, of course, is true as to the "Breeding record". It is only necessary to cut the canvas between the section 5 and the book and section 5 with the "Breeding record" may be permanently filed. Or the record book with section 5 still attached may be filed together. When section 5 is raised and secured in place by the catch 9, a protecting pocket is formed between it and the base or back 1. This pocket contains and protects the record book which, in turn, provides the flexible hinge connection between the pocket side members or walls.

Fig. 5 represents a modification. In this form, the book 18 is mounted vertically. Its strip is pasted, vertically, to the base 1 below the catch 9 and its leaves open vertically. It may be severed from the back in the same way that the record book is severed in the other form. A canvas hinge strip 17, in this form, connects the sections 1 and 5. To prevent the lower outer corners of the pages being curled over or "dog's eared" by closing of the section 5 against the book, the corners are rounded or cut away so that they will not be engaged by 5. This book, in addition to the sections described for the other book, has provision for an "Insurance record" at its center. When opened at the center, the continuous center sheet provides ample space, horizontally, for all entries for an insurance record. It is divided into the usual vertical columns, appropriately headed. Otherwise, the modification of Fig. 5 is the same as the preferred form.

The calendar has been illustrated with reference to use by farmers. It is obvious that it is universally usable by people in all walks of life. The tables and data used would simply be adapted to the particular use.

Changes may be made in the construction, arrangement and disposition of the various parts of the invention, within the scope of the appended claims and it is meant to include all such within this application wherein only a preferred form and a single modification have been disclosed, purely as illustrative of the invention and with no intent to in the least degree limit the application by such illustration.

Having thus described my invention, what I claim and desire to protect by Letters Patent is:—

1. In a combination calendar and record, a base section, a second section, a strip of fabric connecting said sections permitting the second section to be swung vertically upward in superposed position on the base section, a record book connected to said strip between the edges of said sections so that it may be readily severed from both sections, means for securing the second section in raised position with said book between it and the base section, a calendar pad having its top edge connected to the rear side of the second section, and means engaging the lower free edges of the calendar to hold the same flat against said section, said calendar being visible for reference when said second section is raised.

2. In a combination calendar and record, a base section, a second section, a fabric strip flexibly hinging said sections to permit vertically upward swinging of the second section toward the base section, a record book secured to said strip centrally of said strip and between the edges of said sections and severable through said strip from both said sections, means carried by the base section to engage the free edge of the second section and hold it raised with the book between said sections, a calendar pad connected at its upper edge to the free edge of the rear face of said second section to swing vertically downwardly against the second section when said section is in raised position, and means for holding the calendar sheets flat against the rear of said section when the second section is lowered and the calendar pad is thereby inverted.

In testimony whereof, I affix my signature.

LESTER B. MARTIN.